United States Patent
Perrella et al.

(10) Patent No.: US 8,102,994 B2
(45) Date of Patent: *Jan. 24, 2012

(54) CLIENT SURVEY SYSTEMS AND METHODS USING CALLER IDENTIFICATION INFORMATION

(75) Inventors: Ronald J. Perrella, Norcross, GA (US); Barrett Kreiner, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/650,103

(22) Filed: Dec. 30, 2009

(65) Prior Publication Data
US 2010/0177876 A1    Jul. 15, 2010

Related U.S. Application Data

(63) Continuation of application No. 10/746,804, filed on Dec. 24, 2003, now Pat. No. 7,672,444.

(51) Int. Cl.
*H04M 3/523* (2006.01)

(52) U.S. Cl. ......... 379/265.02; 379/207.15; 379/265.06; 379/265.11

(58) Field of Classification Search .............. 379/209.01, 379/210.01, 265.01–266.09
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Verhoeven | |
| 4,649,533 A | 3/1987 | Chorley et al. | |
| 4,663,777 A | 5/1987 | Szeto | |
| 4,674,115 A | 6/1987 | Kaleita et al. | |
| 4,698,839 A | 10/1987 | DeVaney et al. | |
| 4,791,664 A | 12/1988 | Lutz et al. | |
| 4,797,911 A | 1/1989 | Szlam et al. | |
| 4,802,202 A | 1/1989 | Takahashi et al. | |
| 4,817,133 A | 3/1989 | Takahashi et al. | |

(Continued)

FOREIGN PATENT DOCUMENTS
EP    0821511 A2    7/1997
(Continued)

OTHER PUBLICATIONS
U.S. Appl. No. 09/812,338, filed Mar. 19, 2001, Smith.
(Continued)

*Primary Examiner* — Harry Hong
(74) *Attorney, Agent, or Firm* — Cantor Colburn LLP

(57) ABSTRACT

An automatic call distribution system includes a first software control module and a caller identification device for capturing caller identification information associated with an incoming call, a call agent station in communication with the automatic call distribution system, and an interactive voice response system in communication with the automatic call distribution system. The interactive voice response system administers a survey to a caller associated with the caller identification information. In response to receiving the incoming call, a transaction is completed between the caller and a call agent. Upon completion of the transaction, the call agent asks the caller to take part in the survey and seeks permission of the caller to use the caller's caller identification information in the survey. Upon obtaining consent from the caller, the call is routed by the automatic call distribution system from the call agent to the interactive voice response system to initiate the survey.

17 Claims, 2 Drawing Sheets

U.S. PATENT DOCUMENTS

| | | |
|---|---|---|
| 4,823,304 A | 4/1989 | Frantz et al. |
| 4,845,743 A | 7/1989 | Lutz |
| 4,850,013 A | 7/1989 | Rose |
| 4,850,103 A | 7/1989 | Takemoto et al. |
| 4,995,075 A | 2/1991 | Angiolillo-Bent et al. |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow et al. |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,333,186 A | 7/1994 | Gupta |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | de Framond |
| 5,467,388 A | 11/1995 | Redd, Jr. et al. |
| 5,475,748 A | 12/1995 | Jones |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew et al. |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,539,809 A | 7/1996 | Mayer et al. |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. |
| 5,703,934 A | 12/1997 | Zicker et al. |
| 5,703,943 A | 12/1997 | Otto |
| 5,724,412 A | 3/1998 | Srinivasan |
| 5,734,706 A | 3/1998 | Windsor et al. |
| 5,742,668 A | 4/1998 | Pepe et al. |
| 5,742,905 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan et al. |
| 5,802,160 A | 9/1998 | Kugell et al. |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi et al. |
| 5,859,903 A | 1/1999 | Lee |
| 5,872,834 A | 2/1999 | Teitelbaum |
| 5,872,934 A | 2/1999 | Whitehouse et al. |
| 5,875,239 A | 2/1999 | Koralewski et al. |
| 5,875,241 A | 2/1999 | Chang et al. |
| 5,878,036 A | 3/1999 | Spartz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,923,744 A | 7/1999 | Cheng |
| 5,930,701 A | 7/1999 | Skog |
| 5,940,484 A | 8/1999 | DeFazio et al. |
| 5,943,416 A | 8/1999 | Gisby |
| 5,946,363 A | 8/1999 | Rominger et al. |
| 5,946,636 A | 8/1999 | Uyeno et al. |
| 5,946,684 A | 8/1999 | Lund |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,005,870 A | 12/1999 | Leung et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,188 A | 2/2000 | Meg |
| 6,021,427 A | 2/2000 | Spagna et al. |
| 6,031,899 A | 2/2000 | Wu |
| 6,044,148 A | 3/2000 | Bleile |
| 6,049,291 A | 4/2000 | Kikinis |
| 6,058,171 A | 5/2000 | Hoopes |
| 6,061,434 A | 5/2000 | Corbett |

| | | |
|---|---|---|
| 6,061,566 A | 5/2000 | Friman |
| 6,064,876 A | 5/2000 | Ishida et al. |
| 6,065,844 A | 5/2000 | Chen |
| 6,072,859 A | 6/2000 | Kong |
| 6,078,581 A | 6/2000 | Shtivelman et al. |
| 6,091,947 A | 7/2000 | Sumner |
| 6,094,478 A | 7/2000 | Shepherd et al. |
| 6,094,573 A | 7/2000 | Heinonen et al. |
| 6,094,574 A | 7/2000 | Vance et al. |
| 6,094,575 A | 7/2000 | Anderson et al. |
| 6,101,246 A | 8/2000 | Heinmiller et al. |
| 6,104,784 A | 8/2000 | Robbins |
| 6,104,800 A | 8/2000 | Benson |
| 6,108,630 A | 8/2000 | Kuechler et al. |
| 6,111,939 A | 8/2000 | Brabanec |
| 6,134,235 A | 10/2000 | Goldman et al. |
| 6,134,311 A | 10/2000 | Ekstrom |
| 6,137,870 A | 10/2000 | Scherer |
| 6,137,871 A | 10/2000 | Maier et al. |
| 6,141,341 A | 10/2000 | Jones et al. |
| 6,141,409 A | 10/2000 | Madoch et al. |
| 6,144,644 A | 11/2000 | Bajzath et al. |
| 6,154,531 A | 11/2000 | Clapper |
| 6,160,876 A | 12/2000 | Moss et al. |
| 6,161,021 A | 12/2000 | Akpa |
| 6,163,595 A | 12/2000 | Parker et al. |
| 6,163,691 A | 12/2000 | Buettner et al. |
| 6,167,254 A | 12/2000 | Chavez, Jr. et al. |
| 6,169,911 B1 | 1/2001 | Wagner et al. |
| 6,173,049 B1 | 1/2001 | Malik |
| 6,178,232 B1 | 1/2001 | Latter et al. |
| 6,181,928 B1 | 1/2001 | Moon |
| 6,185,289 B1 | 2/2001 | Hetz et al. |
| 6,185,426 B1 | 2/2001 | Alperovich et al. |
| 6,192,115 B1 | 2/2001 | Toy et al. |
| 6,192,116 B1 | 2/2001 | Mayak |
| 6,198,480 B1 | 3/2001 | Cotugno et al. |
| 6,198,920 B1 | 3/2001 | Doviak et al. |
| 6,202,023 B1 | 3/2001 | Hancock et al. |
| 6,219,413 B1 | 4/2001 | Burg |
| 6,222,826 B1 | 4/2001 | Faynberg et al. |
| 6,226,367 B1 | 5/2001 | Smith et al. |
| 6,226,369 B1 | 5/2001 | Lim et al. |
| 6,226,399 B1 | 5/2001 | Robinson |
| 6,230,006 B1 | 5/2001 | Keenan et al. |
| 6,233,325 B1 | 5/2001 | Frech et al. |
| 6,236,975 B1 | 5/2001 | Boe et al. |
| 6,243,448 B1 | 6/2001 | Corbett et al. |
| 6,243,461 B1 | 6/2001 | Hwang |
| 6,246,976 B1 | 6/2001 | Mukaigawa et al. |
| 6,252,952 B1 | 6/2001 | Kung et al. |
| 6,256,671 B1 | 7/2001 | Strentzsch et al. |
| 6,262,987 B1 | 7/2001 | Mogul |
| 6,266,399 B1 | 7/2001 | Weller et al. |
| 6,278,704 B1 | 8/2001 | Creamer et al. |
| 6,278,862 B1 | 8/2001 | Henderson |
| 6,282,275 B1 | 8/2001 | Gurbani et al. |
| 6,292,479 B1 | 9/2001 | Bartholomew et al. |
| 6,292,549 B1 | 9/2001 | Lung et al. |
| 6,295,502 B1 | 9/2001 | Hancock et al. |
| 6,301,342 B1 | 10/2001 | Ander et al. |
| 6,301,350 B1 | 10/2001 | Henningson et al. |
| 6,304,644 B2 | 10/2001 | Karnowski |
| 6,310,943 B1 | 10/2001 | Kowalski |
| 6,311,057 B1 | 10/2001 | Barvesten |
| 6,317,488 B1 | 11/2001 | DePond et al. |
| 6,317,781 B1 | 11/2001 | De Boor et al. |
| 6,324,263 B1 | 11/2001 | Sherwood et al. |
| 6,324,271 B1 | 11/2001 | Sawyer et al. |
| 6,327,347 B1 | 12/2001 | Gutzmann |
| 6,332,021 B2 | 12/2001 | Latter et al. |
| 6,333,973 B1 | 12/2001 | Smith et al. |
| 6,337,904 B1 | 1/2002 | Gisby |
| 6,337,979 B1 | 1/2002 | Nakayasu |
| 6,339,639 B1 | 1/2002 | Henderson |
| 6,341,161 B1 | 1/2002 | Latter et al. |
| 6,345,187 B1 | 2/2002 | Berthoud et al. |
| 6,347,136 B1 | 2/2002 | Horan |
| 6,351,637 B1 | 2/2002 | Lee |
| 6,353,664 B1 | 3/2002 | Cannon et al. |
| 6,361,637 B2 | 3/2002 | Martin et al. |
| 6,363,140 B1 | 3/2002 | Pinard |
| 6,363,411 B1 | 3/2002 | Dugan et al. |
| 6,363,664 B1 | 4/2002 | Brutsaert |
| 6,366,661 B1 | 4/2002 | Devillier et al. |
| 6,366,772 B1 | 4/2002 | Arnson |
| 6,377,807 B1 | 4/2002 | Iparrea et al. |
| 6,377,979 B1 | 4/2002 | Yamashita et al. |
| 6,389,124 B1 | 5/2002 | Schnarel et al. |
| 6,400,809 B1 | 6/2002 | Bossemeyer, Jr. et al. |
| 6,400,947 B1 | 6/2002 | Bright et al. |
| 6,404,868 B1 | 6/2002 | Beamish et al. |
| 6,404,875 B2 | 6/2002 | Malik et al. |
| 6,411,692 B1 | 6/2002 | Scherer |
| 6,421,425 B1 | 7/2002 | Bossi et al. |
| 6,422,263 B1 | 7/2002 | Spicer |
| 6,427,003 B1 | 7/2002 | Corbett et al. |
| 6,427,064 B1 | 7/2002 | Henderson |
| 6,434,394 B1 | 8/2002 | Grundvig et al. |
| 6,437,879 B1 | 8/2002 | Temple |
| 6,438,216 B1 | 8/2002 | Aktas |
| 6,438,217 B1 | 8/2002 | Huna |
| 6,438,584 B1 | 8/2002 | Powers |
| 6,442,249 B1 | 8/2002 | Miller, Jr. |
| 6,442,262 B1 | 8/2002 | Moss et al. |
| 6,442,263 B1 | 8/2002 | Beaton et al. |
| 6,442,283 B1 | 8/2002 | Tewfik et al. |
| 6,445,781 B1 | 9/2002 | Heinmiller et al. |
| 6,449,351 B1 | 9/2002 | Moss et al. |
| 6,449,361 B1 | 9/2002 | Okuda |
| 6,462,646 B2 | 10/2002 | Helferich |
| 6,466,653 B1 | 10/2002 | Hamrick et al. |
| 6,477,246 B1 | 11/2002 | Dolan et al. |
| 6,480,589 B1 | 11/2002 | Lee et al. |
| 6,483,898 B2 | 11/2002 | Lew et al. |
| 6,493,430 B2 | 12/2002 | Leuca et al. |
| 6,493,431 B1 | 12/2002 | Troen-Krasnow et al. |
| 6,493,437 B1 | 12/2002 | Olshansky |
| 6,493,439 B2 | 12/2002 | Lung et al. |
| 6,494,953 B2 | 12/2002 | Hayes et al. |
| 6,496,569 B2 | 12/2002 | Pelletier et al. |
| 6,496,571 B1 | 12/2002 | Wilson |
| 6,496,692 B1 | 12/2002 | Shanahan |
| 6,498,841 B2 | 12/2002 | Bull et al. |
| 6,507,737 B1 | 1/2003 | Laham et al. |
| 6,529,500 B1 | 3/2003 | Pandharipande |
| 6,529,591 B1 | 3/2003 | Dosani et al. |
| 6,532,490 B1 | 3/2003 | Lewis et al. |
| 6,539,080 B1 | 3/2003 | Bruce et al. |
| 6,542,583 B1 | 4/2003 | Taylor |
| 6,542,586 B1 | 4/2003 | Helstab |
| 6,542,591 B1 | 4/2003 | Amro et al. |
| 6,542,602 B1 | 4/2003 | Elazar |
| 6,542,812 B1 | 4/2003 | Obradovich et al. |
| 6,546,092 B2 | 4/2003 | Corbett et al. |
| 6,549,621 B1 | 4/2003 | Christie, IV et al. |
| 6,553,110 B1 | 4/2003 | Peng |
| 6,553,221 B2 | 4/2003 | Nakamura et al. |
| 6,556,540 B1 | 4/2003 | Mawhinney et al. |
| 6,560,317 B1 | 5/2003 | Quagliana |
| 6,560,327 B1 | 5/2003 | McConnell |
| 6,566,995 B2 | 5/2003 | Furuuchi et al. |
| 6,570,971 B2 | 5/2003 | Latter et al. |
| 6,570,974 B1 | 5/2003 | Gerszberg et al. |
| 6,574,319 B2 | 6/2003 | Latter et al. |
| 6,580,904 B2 | 6/2003 | Cox et al. |
| 6,584,490 B1 | 6/2003 | Schuster et al. |
| 6,587,458 B1 | 7/2003 | Burg et al. |
| 6,590,970 B1 | 7/2003 | Cai et al. |
| 6,597,905 B1 | 7/2003 | Hijii |
| 6,603,840 B1 | 8/2003 | Fellingham et al. |
| 6,603,854 B1 | 8/2003 | Judkins et al. |
| 6,608,891 B1 | 8/2003 | Pelletier et al. |
| 6,618,474 B1 | 9/2003 | Reese |
| 6,625,595 B1 | 9/2003 | Anderson et al. |
| 6,631,181 B1 | 10/2003 | Bates et al. |
| 6,633,633 B1 | 10/2003 | Bedingfield |
| 6,639,979 B1 | 10/2003 | Kim |

| | | | | | |
|---|---|---|---|---|---|
| 6,650,743 B2 | 11/2003 | Heinmiller et al. | 6,907,034 B1 | 6/2005 | Begis |
| 6,659,597 B2 | 12/2003 | Murata et al. | 6,909,777 B1 | 6/2005 | Latter et al. |
| 6,661,785 B1 | 12/2003 | Zhang et al. | 6,914,953 B2 | 7/2005 | Boerstler |
| 6,665,378 B1 | 12/2003 | Spielman et al. | 6,917,960 B1 | 7/2005 | Decasper et al. |
| 6,665,388 B2 | 12/2003 | Bedingfield | 6,922,411 B1 | 7/2005 | Taylor |
| 6,665,715 B1 | 12/2003 | Houri | 6,928,154 B2 | 8/2005 | Cheaito et al. |
| 6,675,008 B1 | 1/2004 | Paik et al. | 6,931,007 B2 | 8/2005 | Jones |
| 6,677,894 B2 | 1/2004 | Sheynblat et al. | 6,947,531 B1 | 9/2005 | Lewis et al. |
| 6,683,870 B1 | 1/2004 | Archer | 6,952,469 B2 | 10/2005 | Han |
| 6,687,341 B1 | 2/2004 | Koch et al. | 6,970,546 B2 | 11/2005 | Kent, Jr. et al. |
| 6,697,357 B2 | 2/2004 | Emerson, III | 6,977,993 B2 | 12/2005 | Starbuck et al. |
| 6,701,160 B1 | 3/2004 | Pinder et al. | 6,996,211 B2 | 2/2006 | Reynolds et al. |
| 6,714,519 B2 | 3/2004 | Luzzatti et al. | 7,012,999 B2 | 3/2006 | Ruckart |
| 6,718,021 B2 | 4/2004 | Crockett et al. | 7,016,482 B2 | 3/2006 | Moss et al. |
| 6,721,407 B1 | 4/2004 | Michelena | 7,020,250 B2 | 3/2006 | Lew et al. |
| 6,724,872 B1 | 4/2004 | Moore et al. | 7,027,408 B2 | 4/2006 | Nabkel et al. |
| 6,725,872 B2 | 4/2004 | Kindell et al. | 7,027,569 B2 | 4/2006 | Price |
| 6,728,355 B2 | 4/2004 | Kowalski | 7,076,051 B2 | 7/2006 | Brown et al. |
| 6,728,360 B1 | 4/2004 | Brennan | 7,079,837 B1 | 7/2006 | Sherman et al. |
| 6,728,365 B1 | 4/2004 | Li et al. | 7,085,257 B1 | 8/2006 | Karves et al. |
| 6,731,727 B2 | 5/2004 | Corbett et al. | 7,085,358 B2 | 8/2006 | Ruckart |
| 6,732,188 B1 | 5/2004 | Flockhart et al. | 7,085,578 B2 | 8/2006 | Barclay et al. |
| 6,738,615 B1 | 5/2004 | Chow et al. | 7,095,715 B2 | 8/2006 | Buckman et al. |
| 6,748,058 B1 | 6/2004 | Schwend et al. | 7,097,169 B2 | 8/2006 | Mueller |
| 6,748,068 B1 | 6/2004 | Walsh et al. | 7,103,167 B2 | 9/2006 | Brahm et al. |
| 6,751,457 B1 | 6/2004 | Martin | 7,103,662 B2 | 9/2006 | Ray et al. |
| 6,757,274 B1 | 6/2004 | Bedingfield et al. | 7,107,077 B2 | 9/2006 | Lee |
| 6,757,530 B2 | 6/2004 | Rouse et al. | 7,113,577 B2 | 9/2006 | Cook et al. |
| 6,757,732 B1 | 6/2004 | Sollee et al. | 7,127,488 B1 | 10/2006 | Scott et al. |
| 6,757,740 B1 | 6/2004 | Parekh et al. | 7,139,374 B1 | 11/2006 | Scott et al. |
| 6,760,413 B2 | 7/2004 | Cannon et al. | 7,152,118 B2 | 12/2006 | Anderson, IV et al. |
| 6,765,998 B2 | 7/2004 | Bruce et al. | 7,155,211 B2 | 12/2006 | Mun et al. |
| 6,766,003 B2 | 7/2004 | Moss et al. | 7,184,533 B1 | 2/2007 | Shaffer et al. |
| 6,768,792 B2 | 7/2004 | Brown et al. | 7,200,673 B1 | 4/2007 | Augart |
| 6,771,754 B2 | 8/2004 | Pelletier et al. | 7,215,750 B2 | 5/2007 | Nguyen et al. |
| 6,771,755 B1 | 8/2004 | Simpson | 7,228,129 B1 | 6/2007 | Ward et al. |
| 6,771,956 B1 | 8/2004 | Beeler | 7,254,226 B1 | 8/2007 | Roberts et al. |
| 6,775,366 B1 | 8/2004 | Cobbett et al. | 7,257,210 B1 | 8/2007 | Henderson |
| 6,775,371 B2 | 8/2004 | Elsey et al. | 7,313,227 B2 | 12/2007 | Jones |
| 6,775,540 B2 | 8/2004 | Iyer | 7,315,614 B2 | 1/2008 | Bedingfield, Sr. et al. |
| 6,778,524 B1 | 8/2004 | Augart | 7,386,319 B2 | 6/2008 | Rogalski et al. |
| 6,779,020 B1 | 8/2004 | Henrick | 7,403,768 B2 | 7/2008 | Bedingfield, Sr. et al. |
| 6,785,301 B1 | 8/2004 | Chapman et al. | 7,418,096 B2 | 8/2008 | Moton et al. |
| 6,785,368 B1 | 8/2004 | Eason et al. | 7,443,964 B2 | 10/2008 | Urban et al. |
| 6,785,540 B1 | 8/2004 | Wichelman | 7,613,810 B2 | 11/2009 | Romero et al. |
| 6,792,266 B1 | 9/2004 | Masuda et al. | 7,623,645 B1 | 11/2009 | Scott et al. |
| 6,798,841 B2 | 9/2004 | Hansen | 7,631,047 B1 | 12/2009 | Adamczyk et al. |
| 6,798,876 B1 | 9/2004 | Bala | 7,653,191 B1 | 1/2010 | Glasser et al. |
| 6,798,879 B1 | 9/2004 | Beham | 7,672,444 B2 * | 3/2010 | Perrella et al. ........... 379/265.02 |
| 6,804,503 B2 | 10/2004 | Shohara et al. | 2001/0005854 A1 | 6/2001 | Murata et al. |
| 6,807,267 B2 | 10/2004 | Moss et al. | 2001/0006519 A1 | 7/2001 | Voit |
| 6,810,077 B1 | 10/2004 | Dezonno | 2001/0036174 A1 | 11/2001 | Herring |
| 6,810,115 B2 | 10/2004 | Fukuda | 2001/0044898 A1 | 11/2001 | Benussi et al. |
| 6,813,344 B1 | 11/2004 | Lemke | 2001/0048737 A1 | 12/2001 | Goldberg et al. |
| 6,816,481 B1 | 11/2004 | Adams et al. | 2002/0007400 A1 | 1/2002 | Pedersen |
| 6,818,474 B2 | 11/2004 | Kim et al. | 2002/0009184 A1 | 1/2002 | Shnier |
| 6,826,270 B1 | 11/2004 | Welch et al. | 2002/0012426 A1 | 1/2002 | Gupton |
| 6,826,271 B1 | 11/2004 | Kanabar et al. | 2002/0016748 A1 | 2/2002 | Emodi et al. |
| 6,826,617 B1 | 11/2004 | Ansell et al. | 2002/0023265 A1 | 2/2002 | Metcalf |
| 6,830,595 B2 | 12/2004 | Reynolds, III | 2002/0041605 A1 | 4/2002 | Benussi et al. |
| 6,831,974 B1 | 12/2004 | Watson et al. | 2002/0055926 A1 | 5/2002 | Dan et al. |
| 6,842,512 B2 | 1/2005 | Pedersen | 2002/0067816 A1 | 6/2002 | Bushnell |
| 6,845,151 B2 | 1/2005 | Peng | 2002/0077102 A1 | 6/2002 | Achuthan et al. |
| 6,845,512 B2 | 1/2005 | Horng et al. | 2002/0082050 A1 | 6/2002 | Mouutney et al. |
| 6,853,710 B2 | 2/2005 | Harris | 2002/0085687 A1 | 7/2002 | Contractor et al. |
| 6,853,711 B2 | 2/2005 | Brisebois et al. | 2002/0091777 A1 | 7/2002 | Schwartz |
| 6,856,677 B2 | 2/2005 | Leijonhufvud | 2002/0118812 A1 | 8/2002 | Contractor |
| 6,859,827 B2 | 2/2005 | Banginwar | 2002/0119430 A1 | 8/2002 | Szynalski |
| 6,865,266 B1 | 3/2005 | Pershan | 2002/0120629 A1 | 8/2002 | Leonard |
| 6,865,384 B2 | 3/2005 | Sagi et al. | 2002/0122401 A1 | 9/2002 | Xiang et al. |
| 6,868,155 B1 | 3/2005 | Cannon et al. | 2002/0125929 A1 | 9/2002 | Chen et al. |
| 6,870,924 B1 | 3/2005 | Ukon | 2002/0128033 A1 | 9/2002 | Burgess |
| 6,871,076 B2 | 3/2005 | Samn | 2002/0136381 A1 | 9/2002 | Shaffer et al. |
| 6,888,927 B1 | 5/2005 | Cruickshank et al. | 2002/0171581 A1 | 11/2002 | Sheynblat et al. |
| 6,888,972 B2 | 5/2005 | Berg et al. | 2002/0172338 A1 | 11/2002 | Lee et al. |
| 6,891,940 B1 | 5/2005 | Bhandari et al. | 2002/0176563 A1 | 11/2002 | Kryvossidis et al. |
| 6,898,275 B2 | 5/2005 | Dolan et al. | 2002/0183098 A1 | 12/2002 | Lee et al. |
| 6,904,137 B2 | 6/2005 | Brandt et al. | 2002/0188443 A1 | 12/2002 | Reddy et al. |
| 6,904,276 B1 | 6/2005 | Freeman et al. | 2002/0197991 A1 | 12/2002 | Anvekar et al. |

| | | |
|---|---|---|
| 2003/0002633 A1 | 1/2003 | Kredo et al. |
| 2003/0006912 A1 | 1/2003 | Brescia |
| 2003/0012353 A1 | 1/2003 | Tang et al. |
| 2003/0016143 A1 | 1/2003 | Ghazarian |
| 2003/0021290 A1 | 1/2003 | Jones |
| 2003/0022659 A1 | 1/2003 | Mun et al. |
| 2003/0026416 A1 | 2/2003 | Fusco |
| 2003/0032414 A1 | 2/2003 | Melaku et al. |
| 2003/0043974 A1 | 3/2003 | Emerson, III |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0065776 A1 | 4/2003 | Malik et al. |
| 2003/0068020 A1 | 4/2003 | Hamrick et al. |
| 2003/0092384 A1 | 5/2003 | Ross, III |
| 2003/0092432 A1 | 5/2003 | Hwang |
| 2003/0095650 A1 | 5/2003 | Mize |
| 2003/0096581 A1 | 5/2003 | Takamine |
| 2003/0112938 A1 | 6/2003 | Kanakubo et al. |
| 2003/0119522 A1 | 6/2003 | Barclay et al. |
| 2003/0133543 A1 | 7/2003 | Khakoo et al. |
| 2003/0133553 A1 | 7/2003 | Khakoo et al. |
| 2003/0133653 A1 | 7/2003 | Barros et al. |
| 2003/0135562 A1 | 7/2003 | Himmel et al. |
| 2003/0148758 A1 | 8/2003 | McMullin |
| 2003/0152207 A1 | 8/2003 | Ryan |
| 2003/0187949 A1 | 10/2003 | Bhatt et al. |
| 2003/0193967 A1 | 10/2003 | Fenton et al. |
| 2003/0196206 A1 | 10/2003 | Shusman |
| 2003/0198322 A1 | 10/2003 | White, Jr. |
| 2003/0215070 A1 | 11/2003 | Akhteruzzaman et al. |
| 2003/0219107 A1 | 11/2003 | Richardson et al. |
| 2004/0049545 A1 | 3/2004 | Lockridge et al. |
| 2004/0101118 A1 | 5/2004 | Powell |
| 2004/0101124 A1 | 5/2004 | Koch et al. |
| 2004/0109558 A1 | 6/2004 | Koch |
| 2004/0114603 A1 | 6/2004 | Suhail et al. |
| 2004/0114730 A1 | 6/2004 | Koch et al. |
| 2004/0120475 A1 | 6/2004 | Bauer et al. |
| 2004/0125929 A1 | 7/2004 | Pope |
| 2004/0171370 A1 | 9/2004 | Natarajan |
| 2004/0181587 A1 | 9/2004 | Cao et al. |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. |
| 2004/0209604 A1 | 10/2004 | Urban et al. |
| 2004/0209605 A1 | 10/2004 | Urban et al. |
| 2004/0209640 A1 | 10/2004 | Urban et al. |
| 2004/0213396 A1 | 10/2004 | MacNamara et al. |
| 2004/0218743 A1 | 11/2004 | Hussain et al. |
| 2004/0233892 A1 | 11/2004 | Roberts et al. |
| 2004/0242212 A1 | 12/2004 | Bacon et al. |
| 2004/0248560 A1 | 12/2004 | Bedingfield, Sr. et al. |
| 2005/0068166 A1 | 3/2005 | Baker |
| 2005/0073999 A1 | 4/2005 | Koch |
| 2005/0100158 A1 | 5/2005 | Kreiner et al. |
| 2005/0107074 A1 | 5/2005 | Zellner |
| 2005/0147228 A1 | 7/2005 | Perrella et al. |
| 2005/0157861 A1 | 7/2005 | Bossemeyer et al. |
| 2006/0002540 A1 | 1/2006 | Kreiner et al. |
| 2006/0013375 A1 | 1/2006 | Smith et al. |
| 2006/0029209 A1 | 2/2006 | Moton et al. |
| 2006/0152207 A1 | 7/2006 | Riebel et al. |
| 2006/0153173 A1 | 7/2006 | Beck et al. |
| 2006/0270392 A1 | 11/2006 | Scott et al. |
| 2007/0064911 A1 | 3/2007 | Bedingfield, Sr. et al. |
| 2007/0121825 A1 | 5/2007 | Walsh et al. |

FOREIGN PATENT DOCUMENTS

| | | |
|---|---|---|
| KR | 2002014945 A | 2/2002 |
| WO | 97/50225 A2 | 12/1997 |
| WO | 03/030501 A1 | 4/2003 |
| WO | 03/030502 A1 | 4/2003 |

OTHER PUBLICATIONS

U.S. Appl. No. 10/144,555, filed May 13, 2002, Koch et al.
U.S. Appl. No. 10/152,544, filed May 21, 2002, Alston et al.
U.S. Appl. No. 10/200,874, filed Jul. 23, 2002, Scott et al.
U.S. Appl. No. 10/200,906, filed Jul. 23, 2002, Scott et al.
AASTRA Telecom, Press Release, "Aastra Telecom Introduces CNX Conference Bridge", Aug. 29, 2005, 1 page.
Bellcore Specification TR-NWT-000031, Calling Number Delivery, Issue 4, Dec. 1992.
Bellcore Specification TR-NWT-001188, Calling Name Delivery Generic Requirements, Issue 1, Dec. 1991.
Burrell et al., Des. 383,466 "Caller Identification Display with Television Adapter" Sep. 9, 1997.
Egevang et al., "The IP Network Address Translator (NAT)", May 1994, 8 ppgs.
Fuqua et al., Des. 338,889 "Caller Identification Device" Aug. 31, 1993.
Handley et al.,"SIP: Session Initiation Protocol", Mar. 1999, 112 ppgs.
International Search Report; International Application No. PCT/US02/29988; International Filing Date: Sep. 23, 2002; Date of Mailing: Nov. 27, 2002; 1 page.
International Search Report; International Application No. PCT/US02/30068; International Filing Date: Sep. 24, 2002; Date of Mailing: Dec. 9, 2002; 1 page.
J. Boswell et al., "An Advanced HF Receiver Design", Jul. 1994, IEE, Conference Publication. No. 392, pp. 41-47*.
Leung, D494,953 S, "Mobile Phone Caller identification Display", Aug. 24, 2004.
M. Norris, "Transmitter Architectures", 1998, pp. 4/1-4/6, IEE, London, UK.
Testmark [online]; [retrieved on Oct. 31, 2001]; retrieved from the Internet http://www.testmark.com/develop/tml_callerid_cnt.html M. Slawson, "Caller ID Basics", 10 ppgs.
OKI Silicon Solutions Company, Japan Site, [online]; [retrieved on Aug. 31, 2005] retrieved from the Internet http://www.//oki.com/semi/English/m12110/htm "Multi-Lingual Text-to-Speech Processor ML2110" 5 pages.
"RBS 884 Pico System Description", Author Unknown, Ericsson 1/1551-AE/LZB 119 2269 Uae Rev A, Apr. 23, 1998, p. 2-3 to 2-28.
Rekhter et al. "Address Allocation for Private Internets", pp. 1-8, Feb. 1996.
SmartHome, [online]; [retrieved on Aug. 31, 2005]; retrieved from the Internet http://www.smarthome.com/5154.html "The Caller ID System that Speaks for Itself!", 2 pgs.
SmartHome; [online]; [retrieved on Nov. 5, 2001]; retrieved from the Internet http://www.smarthome.com/5154.html "The Caller ID System that SPEAKS of Itself! Talking Caller ID", 3 ppgs.
TelecomWriting [online]; [retrieved on Mar. 6, 2003]; retrieved from the Internet http://www.privateline.com/Cellbasics/Cellbasics.html T.Farley et al.; "Cellular Telephone Basics: AMPS & Beyond", 8 pages.
Talking Caller ID; [online]; [retrieved on Nov. 5, 2001]; retrieved from the Internet http://www.talkingcallerid.com/ "Talking Caller ID by Stealth Software" 4 ppgs.
Thomas, Des. 413,605, "Remote Caller Identificaiton Device" Sep. 7, 1999.
International Engineering Consortium, [online]; [retrieved on Mar. 6, 2003]; retrieved from the Internet http://www.iec.org/online/tutorials/tdma/ "Time Division Multiple Access (TDMA)" 2003, 2 ppgs, IEC.
AASTRA Technologies, [online]; [retrieved on Aug. 31, 2001]; retrieved from the Internet http://www.aastra.com/products/callerids/voicecallerid/be-6060.html "Venture IP Telephone System" 1ppgs.
AASTRA Telecom, [online]; [retrieved on Nov. 5, 2001]; http://www.aastra.com/products/callerids/voicecallerid/be-9090.html "Voice-9090 'Talking Caller ID'" 1p.
AASTRA Telecom [online]; [retrieved on Aug. 31, 2001] retrieved from the Internet http://www.aastra.com/products/callerids/voicecallerid/be-6060.html "Voice-6090 Taling Caller ID" 1p.
Weinandt, D437,879 S, "Caller Identification Printer" Feb. 20, 2001.

* cited by examiner

CLIENT SURVEY SYSTEMS AND METHODS USING CALLER IDENTIFICATION INFORMATION

CROSS-REFERENCE TO RELATED APPLICATIONS

This application is a continuation of U.S. patent application Ser. No. 10/746,804, filed Dec. 24, 2003, the entire contents of which are incorporated herein by reference.

BACKGROUND

The present invention relates generally and in various embodiments to systems and methods for obtaining feedback from a client on services and/or products provided by an establishment. More specifically, the present invention relates generally and in various embodiments to systems and methods for gathering feedback on client satisfaction for services rendered and/or products provided by an establishment through a survey process using caller identification.

Due to today's highly competitive business environment it may be desirable for an organization to obtain feedback from their customers or clients. This enables the organization to ascertain various levels of client satisfaction and may provide them with an advantage over their competitors. This may be especially true in many service industries, where a client's perception of the quality of the services rendered by the service provider may be the only distinction between various competing service providers.

Many methods have been devised to measure client satisfaction through the use of client surveys. Current methods, however, may not always yield satisfactory results, due in part to the timing and the independence of administering the surveys to the clients, thus making it difficult to identify and address immediate client concerns or organizational successes.

SUMMARY

Exemplary embodiments include client survey systems using caller identification information. One exemplary system includes an automatic call distribution system that further includes a first software control module and a caller identification device for capturing caller identification information associated with an incoming call. The system also includes a call agent station in communication with the automatic call distribution system, and an interactive voice response system in communication with the automatic call distribution system. The interactive voice response system administers a survey to a caller associated with the caller identification information. In response to receiving the incoming call, a transaction is completed between the caller and a call agent. Upon completion of the transaction, the call agent asks the caller to take part in the survey and seeks permission of the caller to use the caller's caller identification information in the survey. Upon obtaining consent from the caller, the call is routed by the automatic call distribution system from the call agent to the interactive voice response system to initiate the survey a system.

Other systems, methods, and/or computer program products according to embodiments of the present invention will be or become apparent to one with skill in the art upon examination of the following drawings and detailed description. It is intended that all such additional systems, methods, and/or computer program products be included within this description, be within the scope of the present invention, and be protected by the accompanying claims.

DESCRIPTION OF THE DRAWINGS

Embodiments of the present invention are described herein in conjunction with the following figures, wherein.

DESCRIPTION

Figure 1:
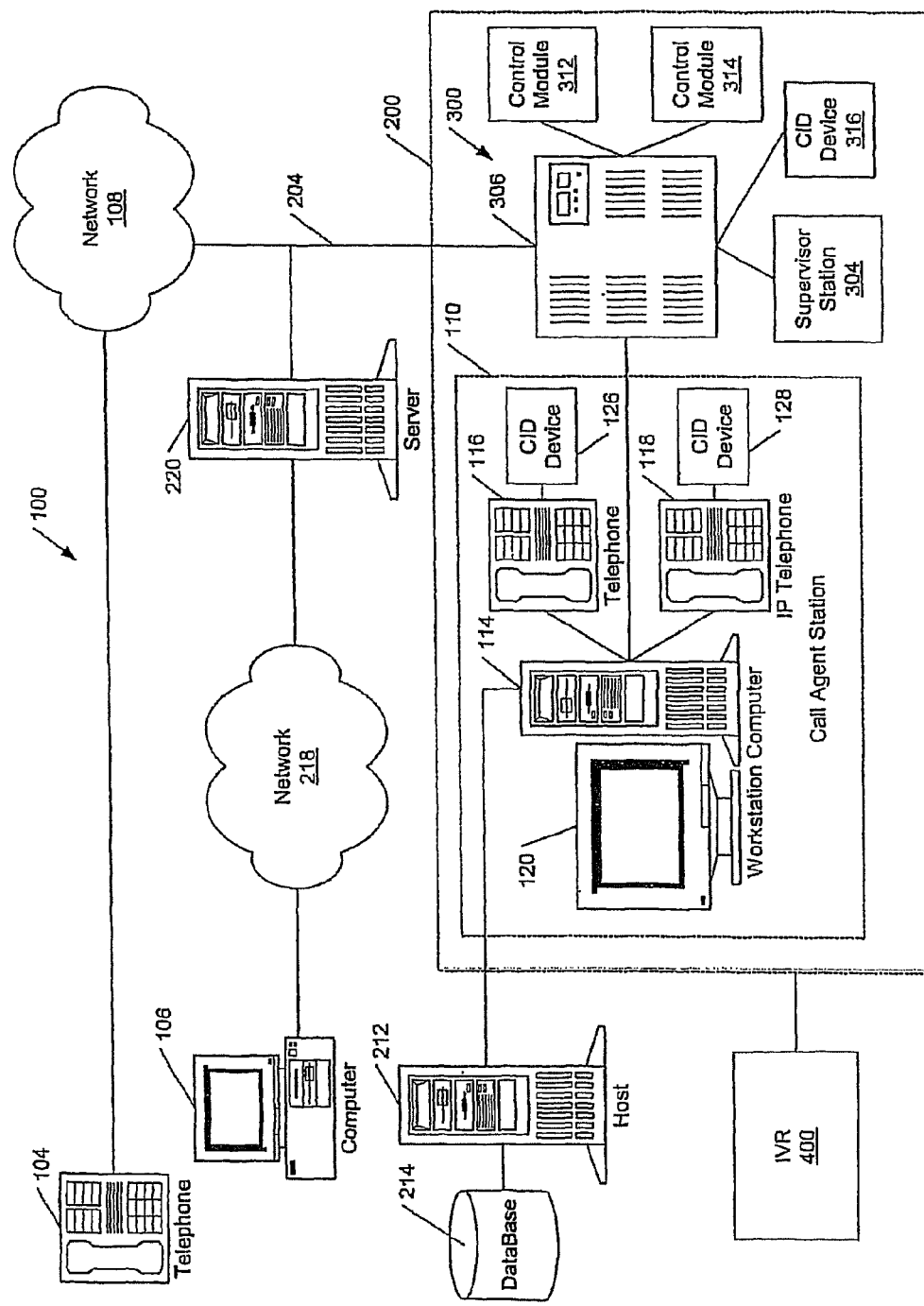
FIG. 1 illustrates various embodiments of a system for conducting client surveys using caller identification information according to the present invention.

It is to be understood that the figures and descriptions of the various embodiments of the present invention described herein, among others, have been simplified to illustrate representative elements of a system and method for obtaining real-time client feedback that are relevant for a clear understanding of the present invention, while eliminating, for purposes of clarity, other elements. For example, call centers, automatic call distributor (ACD) systems, and interactive voice response (IVR) systems are provided as examples of systems that may provide an operating environment and be used in conjunction with various embodiments of the present invention. These systems are described herein as examples of such operating environments that cooperate to provide real-time client feedback systems to facilitate a better understanding of the present invention. Those of ordinary skill in the art will appreciate and readily understand, however, that other elements that may be found in conventional communications networks also may provide additional operating environments for embodiments of the present invention.

Various embodiments of the present invention provide systems and methods for administering client or customer surveys by or on behalf of an organization that is interested in obtaining relevant information from current or future clients about certain aspects or characteristics of the organization. The methods and systems for conducting a survey in accordance with embodiments of the present invention are interactive, real-time or near real-time and client friendly. The methods and systems do not require additional material such as pens, pencils, papers, and do not require additional personnel to administer the survey. The client can easily follow an automated interactive voice response teleprompt and provide their answers in electronic form through, for example, a touch-tone keypad or by speaking the answers. The results of the survey can be easily analyzed and tabulated and can be used for immediate action by the organization to impact client satisfaction. In one of many embodiments of the present invention, the client's caller identification (CID) information can be captured from the telephone line, provided the client is first notified of this and the client approves. Once the client's CID information is captured, they can begin the surveying process without having to identify themselves by a customer number or some other hard-to-remember number. Thus, the client surveying process can occur more quickly and more accurately than when using conventional surveying methods.

Those skilled in the art will appreciate that the CID information, or Calling Number Delivery (CND) information as it is sometimes called, evolved as an extension of Automatic Number Identification (ANI). ANI is a method used by telephone service providers to identify the billing account for a toll call. The CID service became possible with the implementation of Signaling System 7 (SS7).

The CID information is transmitted on a subscriber loop using frequency shift keyed (FSK) modem tones. The FSK modem tones are used to transmit the display message in American Standard Code for Information Interchange (ASCII) character code form. The actual transmission of the display message occurs between the first and second ring. Currently, the CID information transmitted includes the date, time, and calling number. In addition, the name associated with the calling number can sometimes also be included.

The CID information generally includes information that identifies the originating telephone line (e.g., the line that the telephone is connected to). The CID information also includes, for example, the directory number of the originating telephone line (e.g., the telephone number associated with the telephone) that is used as the identification. The name and number of the telephone subscriber also can be sent. The subscriber's name that is sent is that which is associated with the telephone number in the directory listing. Those skilled in the art will appreciate that the telephone service provider has no way of knowing who the actual caller is.

The CID information is sent on a destination subscriber loop between the first and second ring using two modem tones. The CID information is transmitted serially in FSK mode using one of the tones to represent a logic 1 (mark) and the other to represent a logic 0 (space). The CID information uses the same frequencies, modulation type, and data format as the Bell type 202 modems, for example.

A message comprising the CID information includes, for example, a Channel Seizure string followed by a Mark string and then the CID information. The CID information is sent in one of two formats. A Single Data Message Format (SDMF), which contains the date, time, and calling number, and a Multiple Data Message Format (MDMF), which contains the date, time, calling number, and the name associated with that number. Optionally, the number and name fields may contain data indicating that the information has been blocked by the caller or is unavailable. In any case, throughout the description, the term "CID information" is used to describe information transmitted in any one of these message formats among other message formats, for example.

As used herein, in various embodiments of the present invention, the term "client" may encompass, for example, a customer, shopper, consumer, patron, user, buyer, purchaser, and/or end-user of any number of services and/or products. Services can include both commercial and non-profit services, for example. An organization as used herein may encompass, for example, an individual or party that is interested in receiving feedback from existing or future clients to appraise or measure the client's perception of the organization, its services, and/or its products. Such organizations may encompass, for example, any establishment, institution, business, firm, company, concern, and/or non-profit organization and the like, that may be interested in obtaining feedback from a client. Those skilled in the art will appreciate that the survey may be administered by the organization itself, by a third party on behalf of the organization, or by a combination thereof, without departing from the scope of the invention.

As used herein, in the various embodiments of the present invention, the term "call agent" may be referred to as a service agent, a customer service representative, and the like, and can be directly or indirectly associated with the organization that ultimately seeks the client feedback information. In other words, the call center 200 and the call agent can be a third party organization that is hired by the organization that seeks the client feedback information. Furthermore, the call agent can be directly associated with the organization as an employee. The call agent also can be associated with the organization by a predetermined contractual obligation, or the call agent can be a consultant to the organization.

FIG. 1 illustrates one of various embodiments of a system 100 according to the present invention. The system 100 comprises a call center 200 (e.g., a customer service center), an Automatic Call Distribution (ACD) system 300 in communication therewith, and an Interactive Voice Response (IVR) system 400 in communication with the ACD system 300. A client can communicate with the call center 200 using a variety of communication devices such as, for example, a telephone 104 (e.g., land line or wireless) that can include a touch-tone keypad or a personal computer 106. The client can communicate with the call center 200 through a network 108. The client is initially routed by the ACD system 300 to a call agent station 110 that is in communication with the ACD system 300. The ACD system 300 includes one or more software control modules 312 that re-route the client to the IVR system 400 at the end of the transaction between the client and the call agent. The ACD system 300 can execute the software control modules 312 directly or a host computer associated with the call center 200 can execute them. The ACD system 300 also may execute additional software control modules 314 for controlling various aspects of data management associated with the operation of the call center 200. The ACD system 300 also includes a CID device 316 for capturing, displaying, and/or storing the incoming CID information associated with the telephone 104.

The call agent station 110 is occupied by a call agent ready to assist the client. The call agent station 110 can include, for example, workstation computers 114 including a display screen, telephones 116, and Internet Protocol telephones 118. Each telephone 116, 118 can be equipped with CID devices 126, 128, respectively, for example. The workstation computers 114 include network connectivity. In addition, the call center 200 telephones 116 include multi-button functionality and are equipped with a headset to permit the keyboard entry of the client's information into the computer 114 by the call agent.

In accordance with embodiments of the present invention, the client initiates a transaction with the call agent using the telephone 104, which is associated with a unique telephone number as well as other CID information. At the start of the transaction between the call agent and the client, the agent first asks for the client's consent to use the captured CID information associated with the telephone 104. Those skilled in the art will appreciate that the CID information may be captured using conventional CID devices 316, 126, 128, for example. If the client consents to the use of the CID information and the survey, the client can begin the survey process immediately without having to provide any further identification to the call agent such as a customer number or some other form of hard-to-remember identification. In addition, in one of many embodiments of the present invention at the start of the transaction, the IVR system 400 plays a pre-recorded message to inform callers that their CID information may be used for quality control purposes and the like.

In one of various embodiments of the present invention, once the call center's 200 CID device 316 captures the incoming CID information, the ACD 300 transfers the CID information to a surveying system. For example, in one of many embodiments of the present invention, the client and the CID information are transferred to the IVR system 400 in order to administer a survey to the client. The transfer may be processed automatically at the end of the transaction between the client and the call agent after the client consents to the use of the CID information. For example, the client may be transferred to the IVR system 400 by the ACD system 300 associated with the call center 200, which is in communication with the call agent. The CID information is then used to identify the client, the call agent, the nature of the survey, and/or any combinations thereof.

Embodiments of the present invention will be described herein with respect to the administration of a client survey conducted in the call center 200 environment described herein. The survey will be conducted after the client places a telephone call to the call center 200 from the telephone 104 or dials in from the computer 106 via an Internet Service Provider (ISP). The term CID information will be used throughout the remaining portion of the specification to refer to the CID information captured from the telephone 104 as well as the ISP addresses captured from the ISP. The call center 200 captures the CID information and, before proceeding with the survey, the client is asked for consent to use the CID information to associate the client with the survey process and/or the call agent. However, those of ordinary skill in the art will appreciate that other operating environments may be readily substituted for the call center 200 environment without departing from the scope of the present invention.

In one of many embodiments of the present invention, once the client consents to the use of the CID information to the call agent, the call agent at the call center 200 transfers the client and the CID information to the IVR system 400, for example, in order to administer a survey or questionnaire to the client. The survey can be administered through the IVR system 400 in an automatic fashion to gather feedback from the client soon after the interaction between the client and the call agent is complete. The CID information can be used to track the survey, identify the client, identify the call agent, any combinations thereof, etc.

Those skilled in the art will appreciate, however, that although the process in accordance with various embodiments of the present invention are described herein with respect to using the telephone 104 and the personal computer 106 as the communication interfaces between the client and the call agent, and/or the organization, those skilled in the art will appreciate that other communication interfaces, environments, or apparatuses may be employed by the client and/or the organization to conduct the survey without departing from the scope of the present invention. For example, those skilled in the art will appreciate that embodiments of the present invention may be employed in a variety of communications environments without departing from the scope of the invention. Furthermore, the various embodiments of the present invention may be interconnected via many different types and variations of the network 108, which can be a computer network or a telecommunication network, and is not intended to be limited to the examples of the network 108 described herein. Rather, the many embodiments of the present invention may be practiced in a variety of network operating environments including, for example, computer networks and telecommunications systems comprising packet-switches, servers, and modules capable of transmitting and receiving information in the form of packets between various devices interconnected over any predetermined computer and telecommunications networks. For example, the many embodiments of the present invention can operate in various communications environments including, but not limited to, packet-switched networks, Voice over Internet Protocol (VoIP), wireless Fidelity (WiFi), Bluetooth, Ultrawideband, and other operating communications environments.

Furthermore, the various embodiments of the present invention may be employed in conjunction with variations of the network 108. Such networks may include, for example, WAN, LAN, Ethernet, Internet, Web-based networks, and telecommunication networks, among others. In various environments communication between the client and the organization (e.g., the call agent) may occur over computer networks interconnected via telephone lines such as a variety of digital transmission links including those provided by the local telephone company such as, for example, a digital subscriber line (DSL), an asymmetrical digital subscriber line (ADSL), a high bit rate digital subscriber line (HDSL), a single pair symmetrical services (SDSL), an integrated services digital network (ISDN) line, a T-1 digital transmission link, and/or a wireless communication line.

Embodiments of the various components of the present invention and how they interact will now be described below. The call center 200 is a specialized environment that is equipped, staffed, and managed by an organization such as an establishment, institution, business, firm, company, concern, and/or non-profit organization and the like, to handle a large volume of incoming calls. The call center 200 includes the ACD system 300 that connects incoming calls from clients originating from the telephone 104 and/or the computer 106 to the call agent such as, for example, an order taker, a customer-service representative, a help-desk operator, or some other type of customer representative or agent. If an appropriate call agent cannot answer some calls immediately, such calls are placed in a queue and the caller must wait for the next available call agent. While the caller is on hold, the call center 200 might play music, some form of advertising, or may periodically play messages that inform the caller of their status in the queue. The call center 200 also may provide a menu of dialing choices for the caller so that they can be routed in an appropriate way. The call center 200 also includes various CID devices 316, 126, 128 for capturing, storing, and/or displaying CID information.

When an appropriate call agent is assigned to the client, the call agent initially addresses the client's immediate requirements or concerns and asks the client's consent to use the captured CID caller identification information associated with the telephone 104 and/or computer 106. At the same time the call agent may obtain other relevant information from the client and may enter or store this information along with the CID information in a computer database 214, which is in communication with the call center 200. The stored information may be retrieved from the database 214 at a later time, such as, for example, the next time the client calls the call center 200. At such time, the call agent may retrieve the stored information and view it by displaying it on the call agent's computer, for example. The stored information stored in the database 214 may be associated with the CID information as well as the results of the client survey, for example. The client survey generally is administered soon after the call agent captures the client's CID information. The CID information is then processed along with the client's immediate requirements or concerns. The CID information and the client are then transferred to the IVR 400, for example, so that the client can participate in the survey. The stored information including the CID information can be associated with the call agent's position 110 or the call agent such that the client survey results can be traced to a particular call agent position or call agent.

In one of various embodiments of the present invention, the call center 200 is connected to the outside world via the communication lines 204 and can subscribe to various communication services, including digital line service such as 56K Fractional T1 or T1, and ISDN, for example. Other services can include, for example, 800 toll-free numbers to take orders or 900 numbers to provide a service, which can be charged to the client's telephone bill. The call center's 200

ACD system 300 can be a stand alone switching system or can be integrated with a PBX system that can be used to support the operations of the call center 200 without limiting the scope of embodiment of the present invention. The functionality of the ACD system 300 also can be provided by a telephone company's central office or as part of the carrier's Centrex services, for example.

The call agent interacts with the client at the call center 200 via the call agent's workstation computer 114. The call agent can use the workstation computer 114 to enter the client's personal information by filling out standard forms that appear on the display screen, for example. In one of many embodiments of the present invention, the CID device 316 is associated with the switch 306 and is used to capture the caller identification information associated with the telephone 104 and/or the computer 106. The captured caller identification information is then transferred to the call agent's workstation computer 114. Alternatively, CID devices 126, 128 can be associated with telephones 116, 118, respectively, and can be used to capture, store, and/or display the CID information associated with the telephone 104 and/or computer 106. In either case, the CID information is used for associating the client and/or the call agent with a survey only if the client consents to the use of the CID information for such purposes. Otherwise, without the client's consent, the CID information is discarded or deleted from the workstation computer's 114 memory and/or storage, for example, and is not used to associate the client with the call agent and/or the survey process.

A host computer 212 and database 214 are provided in communication with the call agent's workstation computer 114. The database 214 can be used to store the client's personal information including the CID information, associated with the telephone 104 or ISP address associated with the computer 106. If the client consents and grants permission to do so, all of this information can be stored in a central location. The host computer 212 also can be used to sort the client records in a variety of ways and can be used to generate client reports, for example. Additional components of the call center 200 also can include various management information tools such that managers can query the database 214 and retrieve the stored client information and can coordinate or associate such information with the client survey information and/or the CID information, for example. The information stored in the database 214 also can include the telephone number of the call agent's position 110 or the call agent, so that the client's call can be traced to the particular call agent position 110 occupied by the call agent 110 at the time the service was rendered to the client, for example. The call agent's telephone number also can be associated with the incoming CID information associated with the telephone 104 and/or ISP address associated with the computer 106. If the client later consents to participate in the survey, the survey results also can be correlated or associated with the stored client information, including the incoming CID information associated with the telephone 104 and/or ISP address associated with the computer 106, as well as the telephone number of the call agent's position 110 or the call agent who interacted with the client.

In various embodiments of the present invention, the call center 200 can be integrated with an external network 218 through a server 220. The network 218 can be the Internet and the server 220 can be a Web server, for example. By integrating the Internet, for example, with the call center 200, an organization can provide additional personalized services to the client through various Web sites posted by the Web server that give the client additional options and methods for accessing call agents online The client thus may initiate transactions with the service agent online via a Web site. Further, at any time, the client can ask questions by selecting a preferred method of online communication such as, for example, by submitting a question in an online form and having the call agent respond online via e-mail, telephone, or fax. In various embodiments of the present invention, the client also can conduct transactions with the call center 200 through a call center web site hosted by the server 220 via interactive text-chat sessions with the call agent online or place a telephone call over the Internet to talk to the call agent. During a real-time transaction with the client over the call center Web site, the call agent can push Web pages to the client's computer 104 with appropriate text and images that help answer complex questions or illustrate examples.

When the client completes the transaction with the call agent online, the client may consent to participating in a client feedback survey using the CID information as a tracking mechanism. If the client so consents, the call center 200 automatically transfers the client to the IVR system 400 in order to conduct the client feedback survey, for example. For example, the server 220 can re-route the client to the IVR system 400, for example, to administer the client feedback survey. Accordingly, the IVR system 400 can establish a connection with the client's telephone 104 and then proceed to conduct the survey using interactive voice commands and touch tone responses and the like, with the questions and answers being associated with the CID information associated with the telephone 104. Those skilled in the art will appreciate that the client may also be logged onto the web site while the IVR system 400 is conducting the client survey over the telephone 104. Accordingly, the client can request online assistance while completing the survey. Those skilled in the art will appreciate that while the client is transacting with the online web service, the client also can initiate a voice call with a call agent and still view a help window provided by the server 220 to provide information about system requirements and can assist the client in placing a call to the call center 200. When using the Web services, as discussed previously, the CID information will take the form of an ISP address associated with the computer 106.

The ACD system 300 is a general-purpose system that may be used by an organization to implement the various embodiments of the present invention. The ACD system 300 may be installed in any organization that handles a large number of incoming calls such as a customer service center that handles a large volume of incoming calls and employs a plurality of call agents whose responsibilities are almost entirely restricted to handling the incoming calls. The ACD system 300 can be used to rapidly direct calls from calling clients to various call agents that either are available or are qualified (e.g., have the appropriate technical expertise) to address the client's initial request. The ACD system 300 can be used in any one of the following call center 200 environments or applications, among others: customer service centers; help desk; order entry; credit authorization; reservations; insurance claims; and catalog sales, for example. The ACD system 300 can incorporate the latest call-processing technology and benefit from the improvements made in the public switched telephone network, developments in Computer Telephony Integration (CTI), the Internet, and advancements in personal computer related technologies, such as, for example, multimedia technology.

The ACD system 300 is used to greet clients with recorded messages, provide a menu of dial options, and also can be used to route incoming calls to the appropriate call agents as well as to capture the CID information and obtain consent from the client to use the CID information in the survey process. The ACD system 300 also can be used to re-route a client's call to the IVR system 400 to conduct a survey shortly after the interaction between the client and the call agent. Furthermore, the ACD system 300 can be used to obtain the client's consent to associate the CID information associated with the telephone 104 and, if the client consents, use the CID information to associate the survey with the client. As discussed above, an organization may wish to conduct a survey shortly after the interaction between the client and the call agent so that the information garnered from the client is more meaningful. The ACD system 300 also can be linked via private lines to handle calls from within an organization and to form a distributed call-processing system that can route incoming calls over the network 108, 218 to various locations of the organization and then re-route the client to the IVR system 400 in order to conduct the client survey. The ACD system 300 also can handle incoming calls from the network 218 (e.g., the Internet). The ACD system 300 can re-route the client to IVR system 400, once the client completes the transaction with the call agent and can then complete the client survey.

In various embodiments of the present invention, the ACD system 300 executes the software control module 312 for re-routing the client to the IVR system 400. The ACD system 300 also can execute a variety of other software control modules 314 for performing call management and statistical reporting functions such as, for example, tracking the number of incoming calls handled, tracking the number of clients who elected to participate in the survey, tracking the number of clients that were successfully re-routed to the IVR system 400, tracking the number of clients that initially consented to participating in the survey but later chose to abandon the process, and other tracking functions, such as tracking the number of clients who consented to the use of the CID information. The software control modules 314 also can perform the functions of associating the client's telephone number to the call agent's identification information, associating the client's personal information with the call agent's identification information, associating the results of the survey with the call agent's identification, associating the survey results with the client's personal information, associating the CID information with the client, and other association management functions. All of the management and statistical information can be stored in the database 214 and can be accessed by the host computer 212 through the call agent's workstation computer 114 or by any number of computers and other processing devices referred to herein as the management information tools.

The software modules 312, 314 in accordance with the various embodiments of the present invention described herein can comprise a software application (e.g., operating system, browser application, client application, server application, proxy application, on-line service provider application, and/or private network application) installed on the ACD system 300, the agent workstation computer 114, and/or the host computer 212, for example, for directing the execution of instructions. Other examples may include a computer program, code, a set of instructions, or some combination thereof, for independently or collectively instructing the ACD system 300, the agent workstation computer 114, and/or the host computer 212, for example, to interact and operate as programmed. The control modules 312, 314 may be implemented utilizing any suitable computer language (e.g., C.backslash.C++, UNIX SHELL SCRIPT, PERL, JAVA, JAVASCRIPT, HTML/DHTML/XML, FLASH, WINDOWS NT, UNIX/LINUX, APACHE, RDBMS including ORACLE, INFORMIX, and MySQL) and/or object-oriented programming techniques. The control modules 312, 314 also may comprise a device, such as a workstation or PC, a microprocessor, a microcontroller, a network server, a Java virtual machine, an application-specific integrated circuit, a programmable logic array, and/or a fixed logic array, and is not limited to software instructions alone.

The ACD system 300 also comprises, for example, a plurality of incoming communication lines 204, a plurality of call agent positions 110, one or more supervisor positions 304, and a switch 306 for performing the actual call routing and distribution. The switch also may include a CID device 316 associated with it. Although any type of communication lines 204 can be connected to the ACD system 300, various embodiments of the present invention can include communication lines such as, for example, toll-free 800 lines, plain old telephone service (POTS) lines, Integrated Services Digital Network (ISDN) lines, ISDN Primary Rate Interface (ISDN PRI) lines, and others, for example. The ACD system's 300 incoming communication lines 204 also can be routed through a PBX 310, for example in systems that use digital Ti trunks to carry both ACD related calls and other general call traffic. As discussed previously, the ACD system 300 also comprises a software control module 312 that automatically transfers a client call from the call agent to the IVR system 400 to conduct the client survey and gather immediate client feedback data. The ACD system 300 thus can automatically re-route the client to the IVR system 400 at the end of the exchange between the client and the call agent if the client agrees to participate in the survey.

The features and functions of the ACD system 300 in accordance with the various embodiments of the present invention can be implemented using various types of equipment and services. For example, embodiments of the present invention can utilize a stand-alone ACD system that can be used in conjunction with client service centers that are remotely located from the rest of the organization and where the ACD system's functions do not need to be integrated with the organization's telephone system. For example, a client's call can be re-routed to an IVR system that is located remotely outside the organization's telephone system without departing from the scope of the present invention. The ACD system 300 functionality also can be integrated as part of a PBX key telephone system comprising the ACD system 300 software control modules 314 in addition to the software control module 312.

Those skilled in the art will appreciate that the ACD system 300 can be a system component based on a personal computer or a workstation with additional software control modules or functions such as voice mail, interactive voice response, intelligent queue announcements, computer integration, and the software control modules 312, 314 discussed above. These additional software control modules also can be used to collect client call statistics and generate management reports on the client's usage and acceptance rate of the offer to participate in a survey.

Embodiments of the present invention can utilize other types of ACD systems comprising, for example, automatic call sequencers that are independent devices that operate without a switching matrix of their own. These systems perform the same type of call-to-agent station allocation as the conventional switch-based ACD system 300. These systems can be simpler to operate and implement than the conventional ACD system 300 because they rely on the PBX for routing calls. Other embodiments of the present invention may be based on Centrex systems where the telephone company provides the ACD functionality and features as part of its Centrex service. Also, telephone company central office-based systems may be implemented where the telephone company provides ACD functionality and features as a service that is separate from Centrex. Further, third-party service firms may be contracted by an establishment to provide its ACD service.

The operation of the ACD system 300 is geared towards maintaining a certain predetermined level of productivity of the call agents through the efficient distribution of incoming client calls. Managerial personnel such as, for example, a supervisor, or master, may be positioned at the supervisor positions 304 within the ACD system 300. Such managerial personnel have the ability of monitoring individual client calls, call agents, and the overall ACD system 300 activity. The client survey results can be delivered to the managerial personnel in real-time with the survey being associated with the CID information. Therefore, the managerial personnel can take immediate action based on the client survey results without inconveniencing the client by asking for an identification information, such as, for example, a customer number or other hard-to-remember number.

Various embodiments of the present invention can utilize the ACD system 300 to answer a telephone call placed by the client either on the first ring or after a fixed number of rings, capture the CID information, obtain consent from the client to use the CID information in the survey process, and then examine preprogrammed processing tables for routing instructions while the client is placed on hold. The ACD system 300 also can answer calls dynamically by sensing an incoming client call and searching through predetermined routing schemes before answering the call. Once the client call is answered, other systems such as the IVR system 400 may be used to gather additional information and compare that information with the customer database 214 before passing the call to the call agent position 110. The IVR system 400 also may present a query to the client regarding whether the client would be willing to participate in a survey once the transaction with the call agent is complete. Although such structure can be provided within a variety of ACD systems, embodiments of the ACD system 300 according to the present invention include the software control module 312 for re-routing the client's call to the IVR system 400 when the current transaction is complete. Other embodiments of the ACD system 300 can include, for example, other methods of allocating client calls, use of different types of system management reports, and also can comprise various control features. In any case, with the client's consent, the ACD system 300 is used to route the CID information associated with their telephone 104 for the purpose of identifying the client in a survey process.

Various embodiments of the present invention also can comprise a Web-based ACD system 300 within the call center 200 environment that operates on the network 218, which may be a corporate based IP-based intranet or the Internet, for example. Such Web based ACD system 300 environments allow a client user to click on a link provided through a Web page such that a voice connection can be established over the network 218 between the client and the call agent. The call is then transferred to the ACD system 300, where it is routed to the next-available call agent at one of the call agent positions 110. In such systems, the ACD 300 can be used to capture the ISP address and ask for the client's consent to use the ISP address to associate the client with the survey process. Such Web based ACD system 300 can then re-route the client call to the IVR system 400 to conduct a client survey under the control of software control module 312. In any case, with the client's consent, the ACD system 300 is used to route the caller identification information associated with their computer 106, such as, for example, the ISP address for the purpose of identifying the client in a survey process.

The client using such a Web based ACD system 300 can reach the call agent by using the personal computer 106 and clicking on a link provided on the Web site. The ACD system 300 can be a Windows NT-based PNX ACD system, for example. An H.323 call setup occurs between the customer and the ACD system 300. When the call agent is available, an outbound call can be placed to the call agent so that the client and the call agent can conference together. All of the H.323/T.120 packets go through the ACD system 300. Once the call arrives, the call agent uses an interface that includes call-context information, which can include the name of the client, account number, currently viewed URL, subscriber service level, the last time the client placed a call, and the results of the client survey if the client previously completed one. If the client previously completed a survey, the results of that survey can be associated with the previous call agent position 110 and the client can be routed to the same call agent position 110 if the survey results were favorable, or can be routed away from that call agent position 110 if the results were negative. In addition, the interface can include a virtual button to initially ask the client whether they wish to participate in a client survey. The interface also can include another virtual button to re-route the client to the IVR system 400 to actually conduct the survey.

In general, the IVR system 400 enables the client to conduct transactions with an organization without a live attendant. The IVR system 400 uses a telephone keypad as an information retrieval and data gathering medium. In general, a recorded voice message prompts the client with questions and a menu of choices for each question. The client then responds to the inquiries or commands by using the telephone touch tone keypad, for example. In various embodiments of the present invention, the IVR system 400 conducts the client survey by presenting one or more questions to the client from a predetermined list of questions stored in a computer by way of announcements. This type of communication exchange also can be referred to as audiotext. As discussed previously, the client is re-routed to the IVR system 400 by the ACD system 300 once the client completes a transaction with the call agent.

In various embodiments of the present invention, the IVR system 400 accepts the call transferred from the ACD system 300 and the caller identification information associated with the telephone 104 and administers a predetermined client survey by asking the client a number of questions in multiple-choice answer format. The client can respond to each question by entering the appropriate digit from the telephone 104 using its touch-tone keypad after the pre-recorded announcement. This type of IVR system 400 based client survey provides requested information to the organization immediately after the client completes a transaction with the call agent. Thus, the information provided in response to the survey is fresh, more likely to be accurate, and it is more likely that the client will actually engage in and participate in the survey. This enables the organization to meet its need for client feedback information efficiently and economically without having to devote additional staff to administer routine survey questions. Also, because the survey is administered over the IVR system 400 and responses are received electronically in real-time, the survey results can be easily and immediately tabulated and analyzed. Thus, a manager at the call center 200 supervisor position 304 can take immediate action and make routing adjustments within the call center 200 based on the real-time survey results. For example, if one of the call agent positions 110 consistently receives negative treatment on various client surveys, the manager can immediately begin routing incoming calls from clients away from that particular call agent position 110 or call agent, for example. Conversely, if the survey results indicate that the particular client is pleased with the call agent at a particular call agent position 110, the manger can take steps to route calls from that particular client to the preferred attendant position 110. What makes this possible is the ability of associating the particular call agent position 110 identification information (e.g., telephone extension number) with the results of the client survey and storing this information in the database 214.

The IVR system 400 can take many forms. For example, the IVR system 400 can be a stand alone system. The IVR system 400 can be an integral function of a PBX or ACD system 300, for example. In other embodiments, a telecommunications carrier can provide the IVR system 400 as a service. Thus, an organization can offer their clients a variety of call processing functions, including interactive voice response. In other embodiments, the IVR system 400 can be custom designed for the particular application of conducting and administering the client survey.

Organizations are able to improve client service by offering the client a mechanism for providing immediate feedback to the organization soon after utilizing services provided by the organization while the information is still fresh in the client's mind by utilizing the IVR system 400. Furthermore, the organizations are able to improve client service by offering the client a mechanism for capturing the CID information and associating that with client participating in the survey process. This also provides the organization with a more consistent way of exchanging information and transacting business with their clients via the telephone 104, for example, and relieves the client from having to provide a customer identification information or other hard-to-remember number because the client's caller identification information is automatically captured when they dial in.

Embodiments of the present invention also provide IVR systems 400 that operate with touch-tone telephones as well as voice capture. Further, although the IVR system 400 can deliver survey questions via recorded voice announcements, the information also can be delivered to the client in printed form, such as, for example, by using fax on demand functionality or fax back that enables the client to select any one or more documents from a menu of available items that is described to them over the IVR system 400. Thus, the client can receive information at their fax machine instantly and can provide feedback to the responses using the telephone 104 with touch-tone features, for example.

The process flow and navigation of the IVR system 400 can be illustrated by the following example. The client calls into a service call center 200 using the telephone 104 to receive assistance on a product purchased, service rendered, or to receive a service from an establishment that provides the product or service or that is acting as an agent or representative of the actual provider (e.g., the organization). The ACD system 300 captures the CID information associated with the telephone 104 at the call center 200 using the CID device 316 and routes the client to an available call agent that is capable of assisting the client. The ACD system 300 also transfers the CID information to the call agent's workstation computer 114. Alternatively, any one of the call agent's CID devices 126, 128 also may be used to capture the incoming CID information associated with the telephone 104. If no call agents are available at that time, the ACD system 300 keeps the client on hold until an appropriate call agent becomes available. Once the client completes the transaction with the call agent, the call agent asks the client for consent to participate in a client survey and whether they consent to the use of the captured CID information associated with the telephone 104 for identifying the client for purposes of conducting the survey. If the client consents to the use of the CID information and also consents to participating in the survey, the client is instructed to remain on the line. In the meantime, under the control of the software control module 312, the call is automatically re-routed by the ACD system 300 to the IVR system 400. The client is then provided with the directions for completing the survey and may respond to the questions using the telephone's 104 touch-tone keypad or may audibly provide the answers if the IVR system 400 is equipped with a voice activated response system. The responses are captured, recorded, time stamped, and optionally tagged for client call back and are associated with the CID information. Once the survey is completed, the client may hang up.

Embodiments of the present invention also can provide additional built-in editing features to allow the client to correct their answers to any submitted responses. These features can be used to eliminate errors that may be made during the survey process. Also, during the survey process, the client can be provided with customized surveys that are specifically tailored for a particular demographic based on information about the client stored in the database 214. The client also can choose one or more different surveys for which they are eligible from a menu listing all the available options of different surveys.

In other embodiments, the IVR system 400 can take into account whether the client is a first time caller to the call center 200 or a first participant of the survey process. If so, the IVR system 400 can be configured to guide the client through the survey process using more detailed options or instructions, for example.

Figure 2:
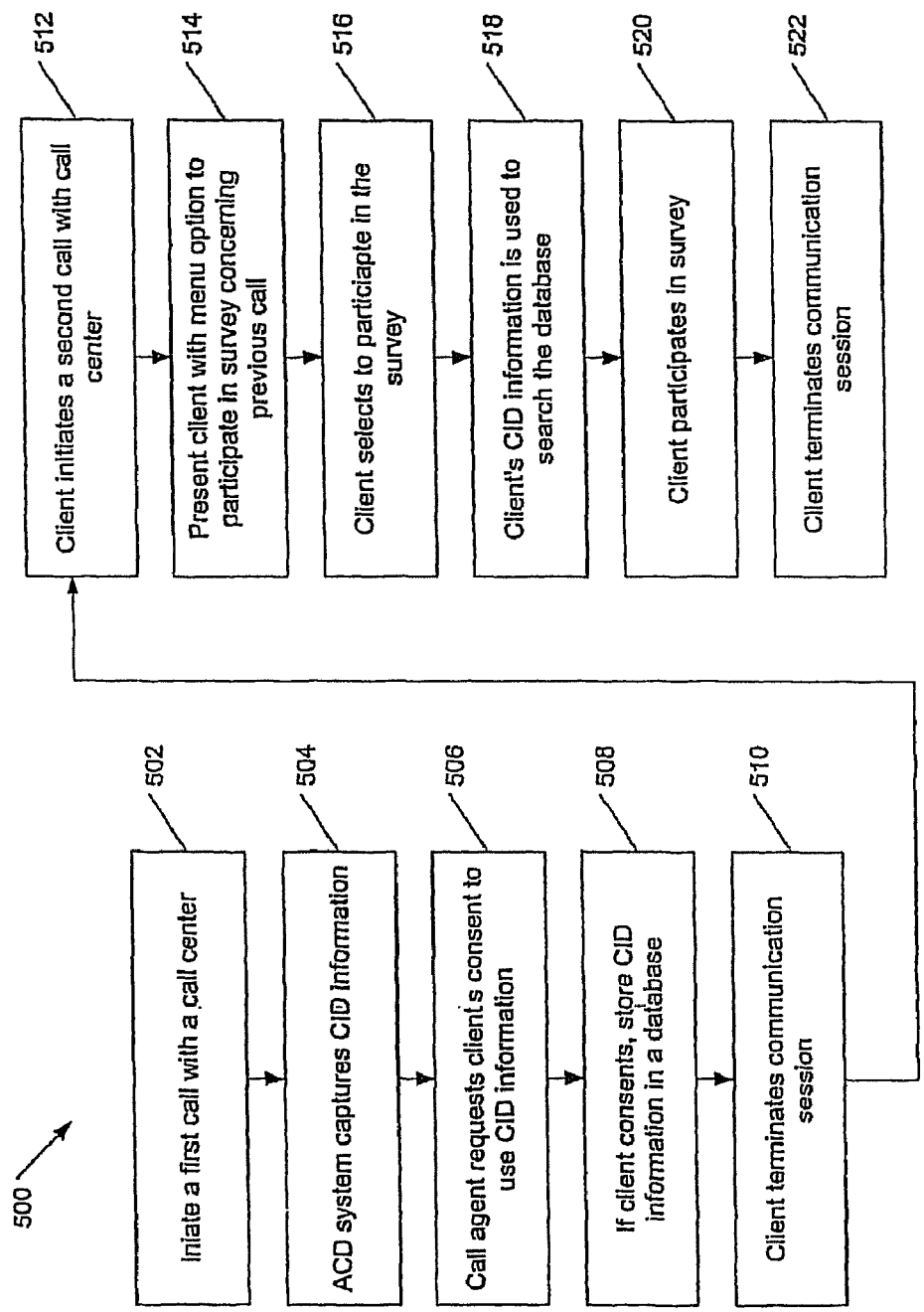
FIG. 2 is a process flow diagram of the survey process of various embodiments of the present invention.

FIG. 2 is a process flow diagram 500 of various embodiments of the present invention. The process flow diagram 500 describes the steps that are executed in order to administer the client survey using the CID information associated with the communication device used to access the call center, e.g., the telephone 104 and/or the computer 106. At block 502 the client initiates a transaction with the organization by placing a telephone call to the main number of the organization's call center 200 using the telephone 104 or by dialing in through the computer 106 using an ISP. At block 504 the CID information associated with the communication device is captured and is used to store, for example, the client's telephone and the call agent's or service representative's identification information. Those skilled in the art will appreciate, that to protect the client's privacy, the call agent must first seek consent from the client in order to use the captured CID information for further client identification and association purposes. Therefore, at block 506, the call agent requests the client's consent to use the CID information for further processing. After the call agent interacts with the client and if the client consents to proceed with the use of the CID information, the call agent notifies the client that they may choose to answer a survey, such as for example, a customer satisfaction survey and that their CID information may be used to associate the survey with the client and/or the call agent. If the client agrees to participate in the survey, the call agent instructs the client to remain on the line. At block 508, the CID information such as, for example, date, time, calling number, the name associated with that number, and/or ISP address and the call agent's identification information are stored in the database 214. Once the CID information and the call agent's identification information are stored in the database 214, the client may proceed to the survey, in which case the call may be traced back to the particular call agent that serviced the client. In one of various embodiments of the present invention, once the CID information and call agent identification are stored in the database 214, at step 510 the client may choose to hang up or otherwise terminate the communication session with the call center 200. At block 512, the client calls back the call center 200 and at block 514 a menu option allows for the client to participate in a survey concerning the previous call. At block 516, the client selects the survey option and at block 518 the client's CID information is used to search in the database 214 to find the identification number of the call agent that previously serviced the client. At block 520, the client participates in a survey and answers specific questions concerning the call agent associated with the client's CID information. At block 522, the client hangs up or otherwise terminates the communication session with the call center 200. Thus, the survey results can be related or associated with the client and the call agent that provided the service. Accordingly, it becomes easier to identify and track the survey results associated with particular call agents and that information can be used as to evaluate the performance of the call agent and/or provide valuable feedback of certain clients' views of specific call agents.

Although the present invention has been described with regard to certain embodiments, those of ordinary skill in the art will recognize that many modifications and variations of the present invention may be implemented. The foregoing description and the following claims are intended to cover all such modifications and variations. Furthermore, the components and processes disclosed are illustrative, but are not exhaustive. Other components and processes also may be used to make systems and methods embodying the present invention.

What is claimed is:

1. A system, comprising:
an automatic call distribution system adapted to communicate over a network, wherein the automatic call distribution system comprises a first software control module and a first caller identification device for capturing caller identification information associated with an incoming call, and wherein the automatic call distribution system is configured to route the incoming call and the caller identification information received from the network;
a call agent station in communication with the automatic call distribution system, wherein the call agent station is configured to receive incoming calls and caller identification information routed from the automatic call distribution system, and wherein the call agent station is operated by a call agent that is identified by predetermined call agent identification information; and
an interactive voice response system in communication with the automatic call distribution system, the interactive voice response system configured to administer a survey to a caller associated with the caller identification information,
wherein, in response to receiving the incoming call at the automatic call distribution system, a transaction is completed between the caller and the call agent, upon completion of the transaction the call agent asks the caller to take part in the survey and seeks permission of the caller to use the caller's caller identification information in the survey; and, upon obtaining consent from the caller, the call is routed by the automatic call distribution system from the call agent to the interactive voice response system to initiate the survey.

2. The system of claim 1, further comprising a database in communication with the automatic call distribution system;
wherein, the caller identification information is associated with the call agent identification information and is stored in the database; and
wherein survey responses are stored in the database.

3. The system of claim 1, further comprising a supervisor station in communication with the automatic call distribution system, wherein a supervisor at the supervisor station makes incoming call routing decisions based on the results of the survey.

4. The system of claim 1, further comprising a second software control module for controlling one or more aspects of survey response data and associating the survey response data with the caller identification information, the controlling and associating comprising:
tracking the number of incoming calls handled;
tracking the number of callers who elected to participate in the survey; and
tracking the number of callers that were successfully re-rerouted to the interactive voice response system.

5. The system of claim 1, further comprising a second software control module for controlling one or more aspects of survey response data and associating the survey response data with the caller identification information, the controlling and associating comprising;
tracking the number of callers that initially consented to participate in the survey but later chose to abandon the survey; and
tracking the number of callers who consented to the use of the caller identification information.

6. The system of claim 5, wherein the survey response data is associated with the caller identification information and the call agent identification information.

7. The system of claim 1, wherein the automated call distribution system answers incoming calls dynamically by sensing an incoming call and searching through predetermined routing schemes before answering the incoming call.

8. A system, comprising:
an automatic call distribution system adapted to communicate over a first network and a second network, wherein the automatic call distribution system comprises a first software control module and a caller identification device for capturing caller identification information associated with an incoming message and an incoming call, the incoming call representing a first call from a caller, and wherein the automatic call distribution system is configured to route the incoming message received from the first network and is configured to route the incoming call received from the second network;
a server in communication with the automatic call distribution system, wherein the server is adapted for receiving the incoming message from the first network;
a call agent station in communication with the automatic call distribution system, wherein the call agent station is configured to receive the incoming message, the incoming call, and the caller identification information associated with the incoming message and the incoming call are routed from the automatic call distribution system, and wherein the call agent station is operated by a call agent that is identified by predetermined call agent identification information; and
an interactive voice response system in communication with the automatic call distribution system, the interactive voice response system configured to administer a survey to the caller associated with the caller identification information,
wherein, in response to receiving the incoming call at the automatic call distribution system, a transaction is completed between the caller and the call agent, upon completion of the transaction the call agent asks the caller to take part in the survey and seeks permission of the caller to use the caller's caller identification information in the survey; and, upon obtaining consent from the caller, the first call is routed by the automatic call distribution system from the call agent to the interactive voice response system to initiate the survey, and a supervisor station receiving a result of the survey and the caller identification of the caller in real time;

wherein the survey is associated with the caller identification information and the call agent identification information of the call agent that conducted the transaction through the first and second networks.

9. The system of claim 8, wherein the first network is the Internet, the second network is a telephone network, and the call agent station further comprises an Internet Protocol telephone.

10. The system of claim 8, further comprising a second software control module for controlling one or more aspects of survey response data management and associating the survey response data with the client's caller identification information, the controlling and associating comprising at least one of:

tracking the number of incoming calls handled;
tracking the number of callers who elected to participate in the survey;
tracking the number of callers that were successfully re-routed to the interactive voice response system;
tracking the number of callers that initially consented to participate in the survey but later chose to abandon the survey; and
tracking the number of callers who consented to the use of the caller identification information.

11. The system of claim 8, wherein, in response to determining the caller is a first time participant in a survey via the caller identification information and the call agent identification information stored in the database, the interactive voice response system is configured to guide the caller through the survey using instructions having greater detail than instructions otherwise provided.

12. A method of conducting a survey with a client, comprising:

receiving a first call at a call center from the client using a communication device;
capturing caller identification information associated with the communication device;
at the call center, routing the first call and the caller identification information to a call agent identified by call agent identification information;
associating the caller identification information with the call agent identification information;
completing a transaction between the client and the call agent;
asking the caller to take part in the survey upon completion of the transaction and seeking permission of the client to use the client's caller identification information in the survey; and
upon obtaining consent from the client, routing the first call from the call agent to an interactive voice response system to initiate the survey;
wherein, in response to terminating the first call prior to completion of the survey, a menu option is provided to the caller when a second call is initiated by the caller to the call center, the menu option prompting the caller to return to the survey associated with the call that was terminated, wherein the caller is identified with the survey via the caller identification information.

13. The method of claim 12, further comprising:
conducting the survey with the client through the interactive voice response system;
wherein the survey is associated with the caller identification information and the call agent identification information.

14. The method of claim 12, further comprising:
storing the caller identification information with the call agent identification information in a database.
receiving responses to the questions in the survey via touch tone telephone format;
storing the responses in the database; and
associating the responses with the caller identification information and the call agent identification information.

15. The method of claim 14, further comprising:
analyzing the responses; and
adjusting routing traffic in the call center according to the analysis.

16. The method of claim 12, further comprising:
storing the caller identification information with the call agent identification information in a database; and
providing a customized survey tailored for a demographic based on corresponding information stored in the database that relates to the client;
wherein conducting the survey includes providing the client with the customized survey for the demographic.

17. The method of claim 12, further comprising:
providing a menu listing of different surveys for selection by the client, the client;
wherein conducting the survey includes providing a client-selected survey from the menu listing.

* * * * *